United States Patent
Forster et al.

(10) Patent No.: US 6,452,355 B2
(45) Date of Patent: Sep. 17, 2002

(54) CONTROL METHOD AND NUMERICAL CONTROL FOR THE VIBRATION-REDUCED ACCELERATION OF A MOVABLE MACHINE ELEMENT

(75) Inventors: Gerhard Forster, Schwarzenbruck; Juergen Hiller, Forchheim; Peter Kreusser, Aichwald, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/904,936

(22) Filed: Jul. 13, 2001

Related U.S. Application Data

(63) Continuation of application No. PCT/DE00/00034, filed on Jan. 4, 2000.

(30) Foreign Application Priority Data

Jan. 14, 1999 (DE) .......................... 199 01 192

(51) Int. Cl.[7] .............................................. G05B 19/416
(52) U.S. Cl. ........................ 318/569; 318/611; 318/448
(58) Field of Search ................................ 318/448, 569, 318/570, 573, 600, 611, 702; 388/904

(56) References Cited

U.S. PATENT DOCUMENTS

| | | | | |
|---|---|---|---|---|
| 4,164,149 A | * | 8/1979 | Okubo | ........................ 73/594 |
| 4,603,286 A | | 7/1986 | Sakano | ........................ 318/615 |
| 5,266,734 A | * | 11/1993 | Komano et al. | ............... 84/607 |
| 5,276,387 A | * | 1/1994 | Gamble | ........................ 318/135 |
| 5,285,379 A | * | 2/1994 | Gamble | ........................ 364/160 |
| 5,331,264 A | | 7/1994 | Cheng et al. | ........... 318/568.11 |
| 5,602,689 A | * | 2/1997 | Kadlec et al. | ........... 360/78.04 |
| 5,627,440 A | | 5/1997 | Yamamoto et al. | ..... 318/568.11 |
| 5,638,230 A | * | 6/1997 | Kadlec | ..................... 360/78.04 |
| 5,953,493 A | * | 9/1999 | Sano | ............................ 395/80 |
| 5,960,969 A | * | 10/1999 | Habisohn | ..................... 212/275 |
| 6,101,221 A | * | 8/2000 | Habisohn | ..................... 212/270 |

FOREIGN PATENT DOCUMENTS

| | | |
|---|---|---|
| EP | 0685779 | 12/1995 |
| JP | 7-328965 | * 12/1995 |
| JP | 11-89291 | * 3/1999 |
| WO | 9419732 | 9/1994 |

* cited by examiner

*Primary Examiner*—Bentsu Ro
(74) *Attorney, Agent, or Firm*—BakerBotts LLP

(57) ABSTRACT

The present invention is a control method and numerical control for the vibration-reduced acceleration of a movable machine element of a numerically controlled industrial processing machine, in which a path of movement of the machine or machine element is broken down into directly successive interpolatable movement sections In the interpolation, resultant acceleration profiles which lie in a range close to a critical natural frequency of the machine or machine element are carried out with a reduced acceleration. By this method, intervention is made only in critical ranges of the acceleration profile, uncritical ranges remain uninfluenced, as a result of which drastic time losses during positioning can be avoided.

9 Claims, 1 Drawing Sheet

Figure 1:
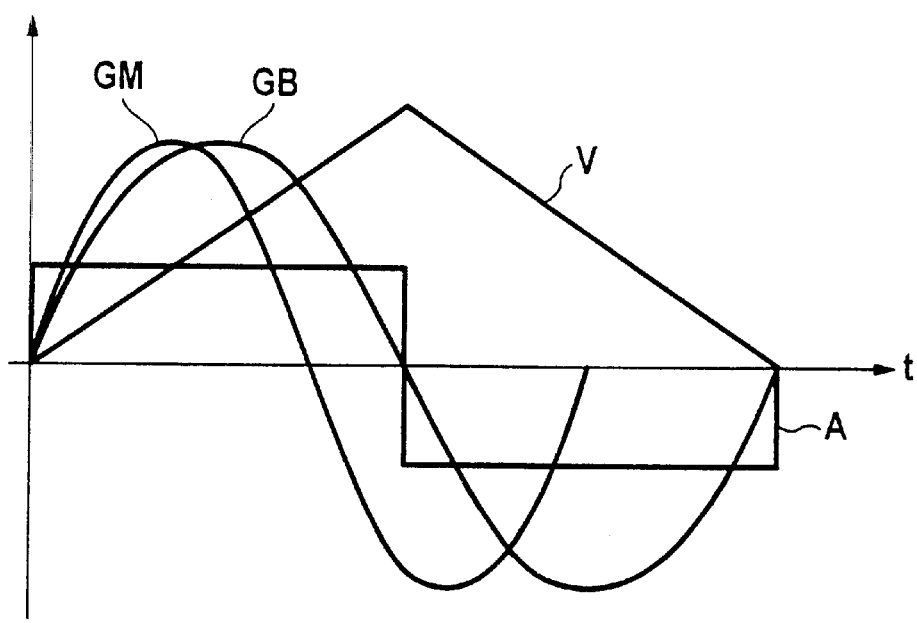

CONTROL METHOD AND NUMERICAL CONTROL FOR THE VIBRATION-REDUCED ACCELERATION OF A MOVABLE MACHINE ELEMENT

This is a continuation of copending application Ser. No. PCT/DE00/00034 filed Jan. 4, 2000, PCT Publication WO 00/42479, which claims the priority of De 199 01 192.3 filed Jan. 14, 1999.

SPECIFICATION

The invention relates to a control method and a numerical control for the vibration-reduced acceleration of the movable machine element of a numerically controlled industrial processing machine such as a machine tool, a robot or the like, wherein a path of movement of the machine element is broken down into directly successive interpolatable movement sections. The invention further relates to a numerical control for carrying out said control method.

BACKGROUND OF THE INVENTION

During control of the movement of movable machine elements of industrial processing machines, the structure of the machine tends to vibrate when accelerating on account of the acceleration jolt. To preserve the mechanical parts of the processing machine, for example a numerically controlled machine tool or a robot, and to achieve an improved surface quality, for example of a workpiece to be finished, it is important to avoid machine vibrations.

Known methods of reducing this vibration tendency use a jolt limitation. Such a jolt limitation may comprise, for example, a trapezoidal acceleration profile. International patent application WO 96/12992, entitled "Velocity control with limited jolting" discloses a control method in which control data are read in a multi-block handling procedure. Prescribed desired speeds are approached as upper speed limits to be maintained as far as possible, and local speed limitations are approached in the form of target speeds at defined target points within the scope of a "look-ahead" procedure, with small acceleration changes within the limits of the maximum permissible jolt.

The use of a jolt filter which always intervenes actively in the acceleration process is also known. However, a disadvantage of such a jolt filter is that it remains active in phases in which it is not required. Furthermore, with a jolt filter, only the amplitude of a vibrational excitation is reduced, while the frequency is not completely filtered out, which leads to drastic time losses during positioning.

It is therefore the object of the present invention to develop an acceleration control that avoids excitation of machine vibration without time losses occurring in uncritical acceleration phases.

SUMMARY OF THE INVENTION

According to the present invention, this object is achieved by a control method for the vibration-reduced acceleration of a movable machine element of a numerically controlled industrial processing machine such as a machine tool, a robot or the like, wherein a path of movement of the machine element is broken down into directly successive interpolatable movement sections. The control method is designed in such a way that, during interpolation, resultant acceleration profiles which lie in a range close to a critical natural frequency of the machine element or of the machine are carried out with reduced acceleration. Acceleration control according to the present invention successfully avoids the excitation of machine vibration because the interpolator takes into account the critical natural frequency and, in the case of acceleration profiles which lie in the proximity of the natural frequency, carries out these profiles with a reduced acceleration. This is based on the realisation that overshooting of a machine element, for example a machine axis, during positioning is not at its greatest during a positioning operation from rapid traversing speed but during positioning from much slower speeds.

The object according to the present invention is also achieved by a numerical control for the vibration-reduced acceleration of the movable machine elements of a numerically controlled industrial processing machine, in which an interpolator is provided for the interpolation of a path of movement of the machine element broken down into directly successive interpolatable movement sections. The interpolator is designed in such a way that, in the interpolation, it carries out resultant acceleration profiles which lie in a range close to a critical natural frequency of the machine element, or of the machine, with a reduced acceleration.

It is particularly advantageous if the lowest natural frequency of the machine element or of the machine is taken as the critical natural frequency. It is even more advantageous if the lowest natural frequency of a machine axis or of the machine foundation bed is chosen. Furthermore, a particularly good limitation of vibrations is achieved if the acceleration is reduced to at least 90% of the maximum possible acceleration or of the nominal acceleration.

Figure 2:
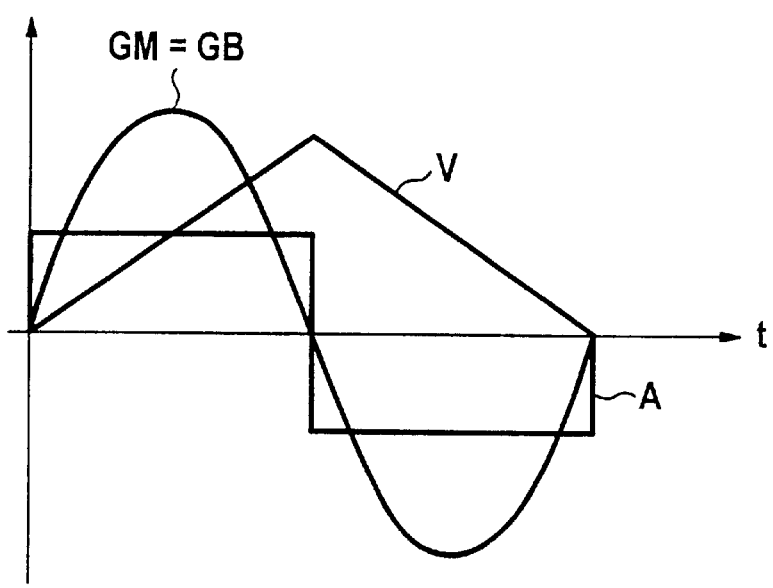

Further advantages and details of the invention will be apparent from the following detailed description of the present invention in the context of an exemplary embodiment and in connection with the figures, in which:

FIG. 1 shows a time diagram of a positioning operation from a rapid traverse; and FIG. 2 shows a time diagram of a positioning operation from a slower speed.

In FIG. 1, a time diagram of a positioning operation from a rapid traverse is shown. In this case, the speed V, the resultant acceleration A and also an associated acceleration profile GB and the fundamental vibration GM are plotted over time t. A triangular speed profile V is shown, in which the maximum possible speed is reached with a constant acceleration, in order subsequently to reach the target state at the speed of zero at the exact time by a constant negative acceleration and a resultant speed. As is known, acceleration represents the first derivative from the speed V. This explains the acceleration profile A as shown.

The sinusoidal profile of the fundamental vibration of the machine GM, also plotted over time t, represents the critical natural frequency of the machine element or of the machine. The sinusoidal profile of the fundamental vibration of the acceleration profile GB is associated with the positioning operation actually shown. The acceleration profile likewise represents a full sine period and reaches zero at the same point in time as the speed V and acceleration A.

The present invention is based on the realisation that overshooting, for example of a machine axis, during positioning is not at its greatest during a positioning operation from rapid traversing speed but during positioning from very much slower speeds. This becomes clear from the fact that the fundamental vibration of the acceleration profile GB and the natural frequency of the machine mechanisms (fundamental vibration of the machine GM) are different. A machine element, for example said machine axis, positions without overshooting, since the critical mechanical natural frequency is not excited.

The situation is different in the time diagram represented in FIG. 2, in which the speed V and the resultant acceleration A are likewise plotted over time t. However, here an unfavorable situation for the machine mechanisms is created, since the fundamental vibration of the machine (natural frequency of the machine mechanisms) GM superposes the fundamental vibration of the acceleration profile GB. GM and GB are congruent. With this combination of acceleration and speed shown in the representation according to FIG. 2, the acceleration operation consequently has the same fundamental vibration as the machine mechanisms. Here, the vibrational excitation is at its greatest.

This effect can be illustrated as shown by the following Fourier series development of a square-wave curve: $Acc(t)=4*a_{max}/pi*(sin(w*t)+\frac{1}{3}*sin(3*w*t)+\frac{1}{5}*sin(5*w*t)+...)$ with $w=2*pi*f$, wherew describes the angular frequency, f the frequency, t the time, $a_{max}$ the maximum possible acceleration, and pi correspondingly stands for the mathematical π.

According to the present invention, during an acceleration control of a movable machine element, an interpolation takes place in such a way that a critical natural frequency of the machine element, as well as the entire machine, is taken into account. In the case of acceleration profiles in which the fundamental vibration of the acceleration profile GB lies in the proximity of the natural frequency (fundamental vibration of the machine GM), this profile is carried out with a reduced acceleration. This has the advantage that no interventions or associated unnecessary time losses are required in uncritical ranges of the acceleration profile.

The most critical frequency of the machine mechanisms is the lowest natural frequency of the machine element or of the entire machine. Therefore, a check is advantageously made to ascertain whether the acceleration profile lies in the proximity of the lowest natural frequency, in order then to carry out this acceleration profile with a reduced acceleration. A reduction of the acceleration to at least 90% of the maximum possible acceleration or of the nominal acceleration is particularly advantageous.

In practice, the lowest natural frequency of a machine axis or of the machine foundation bed is particularly critical. Therefore, it is particularly advantageous for this lowest natural frequency of the machine axis and of the machine foundation bed to be taken into account.

The present invention is further disclosed below on the basis of an actual exemplary embodiment, in which the following assumptions are made:

Critical natural frequency:

$$F_{critical}=20 \text{ Hz} => T_{critical}=50 \text{ ms}$$

Nominal Acceleration:

$$a_{nom}=10 \text{ m/s}^2$$

Critical speed:

$$V_{critical}=a_{nom}*T_{critical}/2=10 \text{ m/s}^2*50 \text{ ms}/2=0.25 \text{ m/s}=15 \text{ m/min}$$

During an acceleration to the critical speed $V_{critical}$, the acceleration is reduced according to the present invention. The reduction may take place to 90% of the maximum possible acceleration, or 90% of the nominal acceleration $a_{nom}$. The resultant fundamental vibration GB of the acceleration profile is then correspondingly: $f_{acceleration}=0.9*a_{nom}*1/V_{nom}/2=0.9*10 \text{ m/s}^2*1/0.25 \text{ m/s}/2=18 \text{ Hz}$.

We claim:

1. A control method for the vibration-reduced acceleration of a movable machine or machine element of an industrial processing machine having a numerical controller comprising:

operating the numerical controller to break down a path of movement of the machine or machine element into directly successive interpolatable movement sections;

carrying out an interpolation in the numerical controller in such a way that resultant acceleration profiles which lie in a range at or close to a critical natural frequency of the machine element or machine are identified; and operating said controller to cause said machine to carry out motions corresponding to said identified acceleration profiles with reduced acceleration.

2. The control method according to claim 1, wherein the lowest natural frequency of the machine or machine element is taken as the critical natural frequency.

3. The control method according to claim 2, wherein the lowest natural frequency of a machine axis or of a machine foundation bed is chosen as the critical natural frequency.

4. The control method according to claim 1, wherein the acceleration is reduced to at least 90% of a maximum possible acceleration or of a nominal acceleration.

5. The control method according to claim 1, wherein the industrial processing machine is a machine tool or robot.

6. A numerical control for the vibration-reduced acceleration of a movable machine or machine element of a numerically controlled industrial processing machine, comprising:

an interpolator for the interpolation of a path of movement of the machine or machine element, said interpolator breaking down said path into directly successive interpolatable movement sections;

said interpolator during the interpolation indentifying movement sections having resultant acceleration profiles which lie in a range close to a critical natural frequency of the machine or machine element and providing signals for carrying out said identified movement sections with reduced acceleration.

7. The numerical control according to claim 6, wherein the lowest natural frequency of the machine or machine element defines the critical natural frequency for the interpolator.

8. The numerical control according to claim 7, wherein the critical natural frequency is the lowest natural frequency of a machine axis or of a machine foundation bed.

9. The numerical control according to claim 6, wherein the interpolator is designed to achieve a reduction in the acceleration to at least 90% of a maximum possible acceleration or of a nominal acceleration.

* * * * *